H. F. JOEL.
SECONDARY BATTERY.
APPLICATION FILED JULY 17, 1908.
916,320.
Patented Mar. 23, 1909.
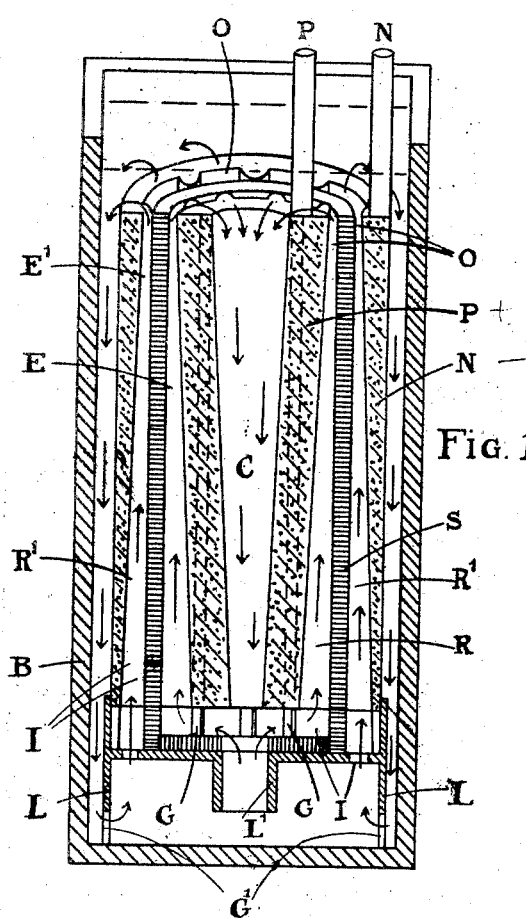
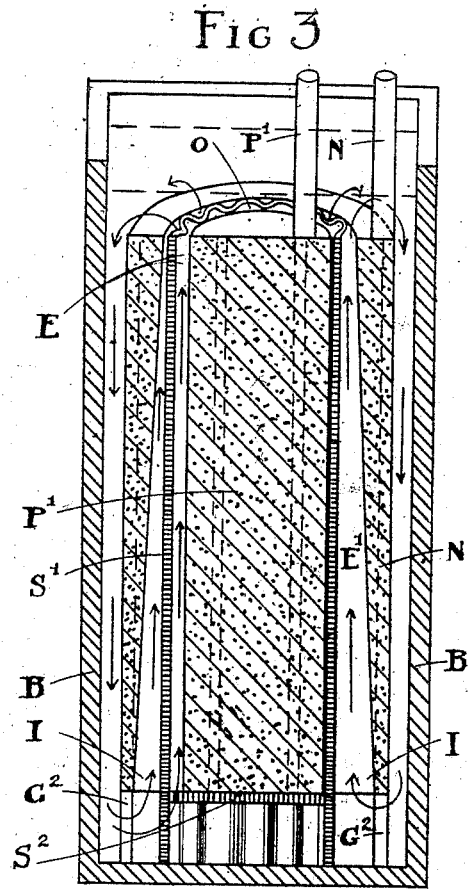
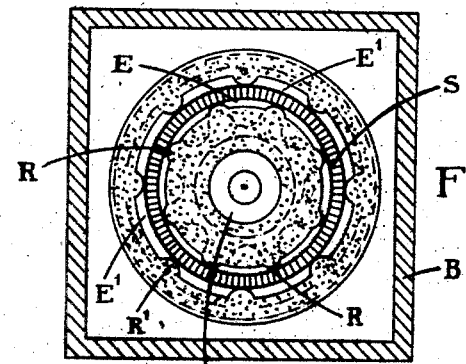
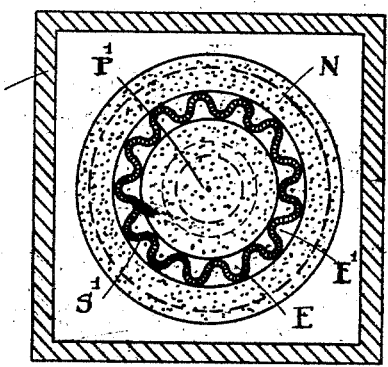

UNITED STATES PATENT OFFICE.

HENRY FRANCIS JOEL, OF LONDON, ENGLAND.

SECONDARY BATTERY.

No. 916,320.　　　Specification of Letters Patent.　　　Patented March 23, 1909.

Application filed July 17, 1908. Serial No. 444,057.

*To all whom it may concern:*

Be it known that I, HENRY FRANCIS JOEL, a subject of the King of Great Britain, residing at London, England, have invented certain new and useful Improvements in Secondary Batteries, of which the following is a specification.

My invention relates to improvements in the construction of secondary batteries, plating baths and the like in which positive and negative elements are employed immersed in acidulated liquid the whole being contained in an outside receptacle to form a complete cell; and the objects of my improvements are, first, to produce an automatic and continuous circulation of the electrolyte; second, to remove any gases clinging to the surfaces of the electrodes; and third, to bring all the dense electrolyte from the bottom of the cell into active circulation. I attain these objects by the mechanism illustrated in the accompanying drawing, in which:—

Figure 1, is a combined sectional and isometric view of a complete cell with electrodes of cylindrical form; Fig. 2, is a plan view of Fig. 1; Fig. 3, is a combined sectional and isometric view of a modified form of cell with cylindrical electrodes; and Fig. 4, is a plan view of Fig. 3.

Similar letters refer to similar parts throughout the several views.

The containing receptacle B may be of any suitable form, preferably it is of rectangular shape so that space is found for providing a good supply of electrolyte. By providing channels between the electrodes which taper off toward their top ends the gas evolved from the faces of the electrodes, gathering volume as it reaches the narrowed outlets of the channels, draws up the liquid electrolyte and forces it over the top of the electrodes to fall again to the bottom on the outside thereof, the dense electrolyte at the bottom is thus utilized to take the place of that drawn up; since the vertical channels are continuous from the bottom to the top of the cell the circulation must take place throughout the whole of the cell and not through a section only of same which is a point of considerable importance. In order further to draw into action the dense electrolyte lying at the bottom of the cell, members extending downwardly from the electrodes are preferably employed having openings near the bottom of the cell.

In Figs. 1 and 2 a cylindrical positive electrode P is placed inside a cylindrical negative electrode N, the cylindrical separator S being interposed between them made of some suitable porous material, such as porcelain or asbestos. The central electrode P is tapered to form a truncated cone with its apex at the bottom, and the negative electrode N is tapered on its inside surface with the small end at the top; both have ridges R, R' formed on their adjacent surfaces, the ridge being deeper at the bottom end than at the top end, so that when placed together with the separator in place a series of channels E, E' is formed on the inside and outside of the separator respectively, which channels have narrow outlets O, O at their top ends and wide inlets I, I at their bottom ends. The surface of the electrodes on each side of the separator S evolve gas under the action of the electric current which gas in passing upwards accumulates with such force as it reaches the narrow outlets O that it draws up the liquid electrolyte, which is forced through the outlets and falls over to the outside of the negative electrode, and through the hollow center C of the electrode P. This movement also sweeps clean the surfaces of the active material tending to prevent reversed polarity. The arrows indicate the circulation of the electrolyte. In order that the dense electrolyte at the bottom of the cell B may be reached a downwardly extending member L is provided in the form of a platform having perforations in its horizontal surface, a central tube L', and openings G' at its base through which the liquid must pass to reach the tapered channels E, E'. The central electrode P is supported on feet G between which are openings by which the electrolyte passing through the tube L' reaches the tapering channels E.

Figs. 3 and 4 show a modified form of the apparatus. In this case the central positive electrode P' is of equal diameter throughout; it may be formed of active material supported on a metallic grid, or as an electrode of the Planté type; it is surrounded by, and rests upon the corrugated porous separating cylinder S' having the platform $S^2$ and this cylinder is of such a size as to loosely fit the small diameter forming the outlets O of the internally tapered negative electrode N when placed in position concentric with the positive electrode. The negative electrode is formed of either the Planté, or pasted type and the metallic part of it is continued below the active material to form feet for the support of the electrode, openings G² being formed between the feet by which the electrolyte returns to the inside of the electrode. It will be seen that a tapered channel is formed as before between the electrodes, being divided up to some extent by the corrugations of the separator S'.

It must be understood that a perforated separating cylinder formed of a substance such as ebonite of non-porous character may equally well be employed instead of a porous cylinder if desired.

It will be understood that in order to produce my invention it is only necessary to employ a tubular negative electrode in which the interior wall is formed of a surface of revolution in which the corresponding points of successive transverse planes therethrough trace a straight line; and a positive electrode within said negative electrode having an outer surface of revolution in which the corresponding points of successive transverse planes therethrough trace a straight line; but in which the inner wall of the negative electrode and the outer surface of the positive electrode are so disposed longitudinally that an upwardly tapering channel is formed therebetween.

What I claim as my invention and desire to secure by Letters Patent, is:—

1. In a device of the class described, the combination of a tubular positive electrode having a surface of revolution in which corresponding points in successive transverse planes therethrough trace a straight line, a tubular negative electrode surrounding the positive electrode, but of less internal diameter at the top than at the bottom, and insulating means introduced between them, said electrodes forming when placed together an inclosed tapered channel connecting the dense portions of the electrolyte in the lower part of the cell with the less dense portions in the upper part of the cell.

2. In a device of the class described, the combination of a tubular positive electrode of greater diameter at the top than at the bottom, a tubular negative electrode, surrounding the positive electrode but of less internal diameter at the top than at the bottom, and insulating means introduced between them, said electrodes forming when placed together an inclosed tapered channel connecting the dense portions of the electrolyte in the lower part of the cell with the less dense portions in the upper part of the cell, substantially as and for the purpose set forth.

3. In a device of the class described, the combination of a tubular positive electrode of greater diameter at the top than at the bottom, a tubular negative electrode surrounding the positive electrode, and insulating means introduced between them, said electrodes forming when placed together an inclosed tapered channel connecting the dense portions of the electrolyte in the lower part of the cell with the less dense portions in the upper part of the cell, substantially as and for the purpose set forth.

4. In a device of the class described, the combination with a tubular positive electrode of greater diameter at the top than at the bottom, and provided with a central hole, of a tubular negative electrode surrounding the positive electrode but of less internal diameter at the top than at the bottom, vertical ridges with parallel edges formed on the adjacent surfaces of the electrodes, and a porous separating cylinder interposed between the said ridges whereby the annular space between the electrodes is divided into a series of vertically tapering channels.

5. In a device of the class described, the combination with a tubular positive electrode of greater diameter at the top than at the bottom, and provided with a central hole, of a tubular negative electrode surrounding the positive electrode but of less internal diameter at the top than at the bottom, vertical ridges with parallel edges formed on the adjacent surfaces of the electrodes, and a perforated separating cylinder interposed between the said ridges whereby the annular space between the electrodes is divided into a series of vertically tapering channels.

6. In a device of the class described, the combination with a tubular positive electrode of greater diameter at the top than at the bottom, and provided with a central hole, of a tubular negative electrode surrounding the positive electrode but of less internal diameter at the top than at the bottom, vertical ridges with parallel edges formed on the adjacent surfaces of the electrodes, a separating cylinder interposed between the said ridges, and a perforated member extending downwardly from the electrodes whereby the dense electrolyte at the bottom of the cell is drawn by the circulating current into the annular channel between the electrodes, substantially as described herein.

7. In a device of the class described, the combination with a tubular positive electrode of greater diameter at the top than at the bottom, and provided with a central hole, of a tubular negative electrode surrounding the positive electrode but of less internal diameter at the top than at the bottom, vertical ridges with parallel edges formed on the adjacent surfaces of the electrodes, a separating cylinder interposed between the said ridges, a cylindrical member extending downwardly from the electrodes, having holes in its bottom edge, and a platform forming part thereof supporting the electrodes and provided with a downwardly extending central tube and with holes beneath the annular space between the electrodes, substantially as and for the purpose set forth.

In testimony whereof I have affixed my signature in presence of two witnesses.

HENRY FRANCIS JOEL.

Witnesses:
 H. D. JAMESON,
 F. L. RAND.